United States Patent
Nardi

[11] Patent Number: 4,604,336
[45] Date of Patent: Aug. 5, 1986

[54] MANGANESE DIOXIDE AND PROCESS FOR THE PRODUCTION THEREOF

[75] Inventor: John C. Nardi, Brunswick, Ohio

[73] Assignee: Union Carbide Corporation, Danbury, Conn.

[21] Appl. No.: 626,104

[22] Filed: Jun. 29, 1984

[51] Int. Cl.[4] .............................................. H01M 4/50
[52] U.S. Cl. .................................... 429/224; 429/217; 429/232; 429/194; 423/605
[58] Field of Search ....................... 429/224, 191, 194; 423/605, 599

[56] References Cited

U.S. PATENT DOCUMENTS

| | | |
|---|---|---|
| 4,133,856 | 1/1979 | Ikeda et al. ..................... 423/605 X |
| 4,172,183 | 10/1979 | Ruetschi ............................. 429/224 |
| 4,246,253 | 1/1981 | Hunter ................................ 423/605 |
| 4,297,231 | 10/1981 | Kahara et al. ................. 429/224 X |
| 4,312,930 | 1/1982 | Hunter ............................... 429/191 |
| 4,476,104 | 10/1984 | Mellors ......................... 429/224 X |

Primary Examiner—Anthony Skapars
Attorney, Agent, or Firm—C. F. O'Brien

[57] ABSTRACT

A novel form of manganese dioxide is produced by heat treating lambda-manganese dioxide at a temperature of between about 250° C. and about 400° C. This manganese dioxide possesses an x-ray diffraction pattern indicating peaks at 3.11, 2.41, 2.11, 1.62, 1.56, 1.43 and 1.31 angstroms, and exhibits desirable electrochemical activity.

12 Claims, 3 Drawing Figures

HEAT TREATED LAMBDA MANGANESE DIOXIDE

MANGANESE DIOXIDE AND PROCESS FOR THE PRODUCTION THEREOF

FIELD OF THE INVENTION

This invention relates to a novel form of manganese dioxide exhibiting desirable electrochemical activity in galvanic cells and possessing an x-ray diffraction pattern which is distinct from those of other known forms of manganese dioxide. In other aspects, this invention relates to a process for producing this novel manganese dioxide as well as a galvanic cell employing such manganese dioxide as its active cathode material.

BACKGROUND OF THE INVENTION

The use of manganese dioxide as a cathode material for galvanic cells has long been known in the art. Manganese dioxide exists in several forms, both natural and synthetic. Natural forms of manganese dioxide include ores such as pyrolusite (beta-manganese dioxide), nsutite (gamma-manganese dioxide) and hollandite (alpha-manganese dioxide). Synthetic forms of manganese dioxide include lambda-manganese dioxide (which is produced by acid-treating $LiMn_2O_4$ as described in U.S. Pat. Nos. 4,246,253 and 4,312,930), delta-manganese dioxide (made by the chemical reduction of potassium permanganate), and epsilon-manganese dioxide (synthesized by dissolving manganous sulfate in water; adding sufficient sodium hydroxide to precipitate manganous hydroxide and render the solution alkaline; and passing a stream of air or oxygen through the mixture to oxidize the precipitate to manganese dioxide).

These various forms of manganese dioxide are characterized by means of their x-ray diffraction patterns, with each form having a spectrum indicating peaks at various characteristic angstrom spacings.

The electrochemical activity of the various forms of manganese dioxide varies greatly. For example, highly crystalline alpha- and beta- manganese dioxide exhibit poor electrochemical performance in both aqueous and nonaqueous galvanic cells. Other forms of manganese dioxide will function desirably in certain types of cells or for certain uses only. For example, lambda-manganese dioxide when employed in nonaqueous electrolyte cells demonstrates a multistep discharge curve with a relatively high initial voltage. While this type of discharge is suitable for cell usages which require such a high initial output, such voltage may be too high for several other cell usages. Consequently, it would be advantageous to provide a novel form of manganese dioxide which exhibits desirable electrochemical activity.

Accordingly, it is an object of this invention to provide a novel form of manganese dioxide which exhibits desirable electrochemical activity.

It is a further object of this invention to provide a process for the manufacture of such novel form of manganese dioxide.

It is yet a further object of this invention to provide a galvanic cell employing such novel manganese dioxide as cathode material.

The foregoing and additional objects will become more fully apparent from the following description and examples and the accompanying drawing.

DESCRIPTION OF THE INVENTION

This invention is directed to a novel form of manganese dioxide characterized by an x-ray diffraction pattern indicating peaks at d values of $3.11\pm0.02$ angstroms, $2.41\pm0.02$ angstroms, $2.11\pm0.02$ angstroms, $1.62\pm0.02$ angstroms, $1.56\pm0.02$ angstroms, $1.43\pm0.02$ angstroms and $1.31\pm0.02$ angstroms. As is employed herein, the term "peaks" refers to crests present in the x-ray diffraction pattern having an $I/I_O$ ratio of at least about 10 percent wherein $I$ is the height of a particular crest and wherein $I_O$ is the height of the highest crest in the spectrum.

In another aspect, this invention relates to a process for preparing the above-described novel manganese dioxide, which process comprises heating lambda-manganese dioxide at a temperature of between about 250° C. and about 400° C., preferably between about 350° C. and about 360° C., until the structure of the lambda-manganese dioxide starting material has been converted into the novel structure of the manganese dioxide of this invention. The progress of this conversion may be monitored by periodic x-ray diffraction analysis.

In yet another aspect, this invention is directed to a galvanic cell comprising an anode, a cathode and an electrolyte, said cell being characterized in that said cathode is comprised of the novel form of manganese dioxide described above.

Figure 3:
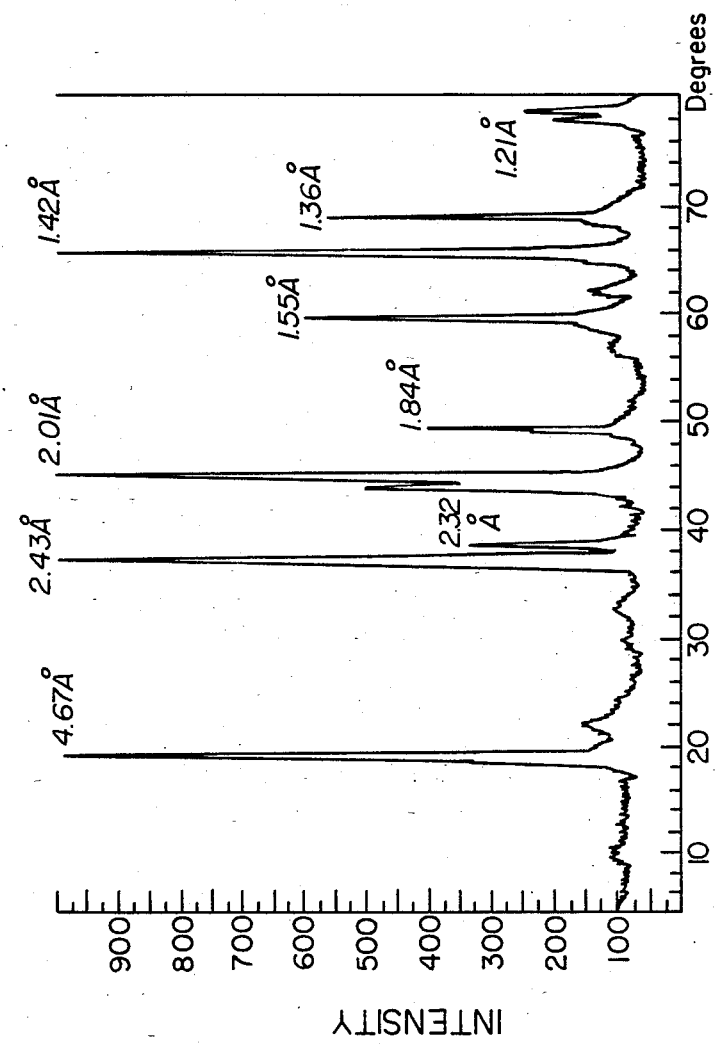
FIG. 3 shows the x-ray diffraction pattern of lambda-manganese dioxide produced in accordance with the disclosure of U.S. Pat. Nos. 4,246,253 and 4,312,930.

The manganese dioxide of this invention is produced by the heat treatment of lambda-manganese dioxide. Lambda-manganese dioxide is disclosed in U.S. Pat. Nos. 4,246,253 and 4,312,930, the disclosures of which are herein incorporated by reference. Lambda-manganese dioxide is produced by acid-treating $LiMn_2O_4$ with an aqueous acid solution until the pH of the solution stabilizes below about 2.5. Lambda-manganese dioxide typically possesses the x-ray diffraction pattern shown in FIG. 3.

The conversion of lambda-manganese dioxide into the novel manganese dioxide of this invention is typically carried out as follows. The lambda-manganese dioxide is placed in a reaction vessel and is heated at between about 250° C. and about 400° C. until the lambda-manganese dioxide is converted into the novel manganese dioxide of this invention. Such conversion is complete when the x-ray diffraction pattern of the manganese dioxide resembles the pattern of FIG. 1—i.e., possessing peaks at $3.11\pm0.02$ angstroms, $2.41\pm0.02$ angstroms, $2.11\pm0.02$ angstroms, $1.62\pm0.02$ angstroms, $1.56\pm0.02$ angstroms, b $1.43\pm0.02$ angstroms and $1.31\pm0.02$ angstroms—rather than the x-ray diffraction pattern of lambda-manganese dioxide, shown in FIG. 3. Preferably, such treatment occurs at a temperature of between about 350° C. and about 360° C. Such heating is preferably done at atmospheric pressure, although higher or lower pressures may be employed. This heating step may typically involve about seven hours when the preferred temperatures of 350°–360° C. are employed.

When the conversion of the lambda-manganese dioxide is complete, the manganese dioxide is typically allowed to cool to room temperature for fabrication into cathodes.

Typically, such manganese dioxide exhibits an x-ray diffraction pattern having peaks having relative intensities as follows:

| d Å | $I/I_O$ (percent) |
| --- | --- |
| 3.11 ± 0.02 | 100 |
| 2.41 ± 0.02 | 80–90 |
| 2.11 ± 0.02 | 28–38 |
| 1.62 ± 0.02 | 65–75 |
| 1.56 ± 0.02 | 18–28 |
| 1.43 ± 0.02 | 20–30 |
| 1.31 ± 0.02 | 35–35 | wherein I is the peak height of the particular peak and wherein $I_O$ is the peak height of the highest peak (i.e. at 3.11 angstroms).

The manganese dioxide of this invention preferably possesses a surface area of less than about 15 m²/gram, most preferably of less than about 10 m²/gram. Consequently, it is believed that it will accordingly exhibit desirable resistance to water pick-up. In addition, the manganese dioxide of this invention preferably possesses a surface area of more than about 3 m²/gram and accordingly exhibits good pulse discharge performance.

The manganese dioxide of this invention is typically mixed with a conductive material and a binder before being compressed into a cathode pellet. Illustrative of the conductive materials which may be employed are graphite, carbon black, metal powders, and the like. Illustrative of the binders which may be employed are polytetrafluoroethylene, copolymers of ethylene and acrylic acid, and the like. Moreover, the manganese dioxide of this invention may be mixed or otherwise combined with other forms of manganese dioxide or with other active cathode materials to form hybrid cathodes if so desired.

When the cathode is to be employed in a cell having a nonaqueous electrolyte, the molded pellet is preferably dried by heating at a temperature of about 120° C. for about 16 hours under an air atmosphere. As a caveat it should be noted that it has been found that cathodes employing the novel manganese dioxide of this invention will be adversely affected if subjected to vacuum drying.

Cathodes comprising the manganese dioxide of this invention may be employed in a multiplicity of cell systems, including those having aqueous electrolytes, nonaqueous electrolytes and solid electrolytes.

Moreover, the cells of this invention may employ a wide variety of anode materials. As will be evident to those skilled in the art, the particular anode materials which may be employed will vary with the particular electrochemical system selected.

EXAMPLES

The following examples are intended to further illustrate the invention and are not intended to limit the scope of the invention in any manner.

EXAMPLE 1

Figure 1:
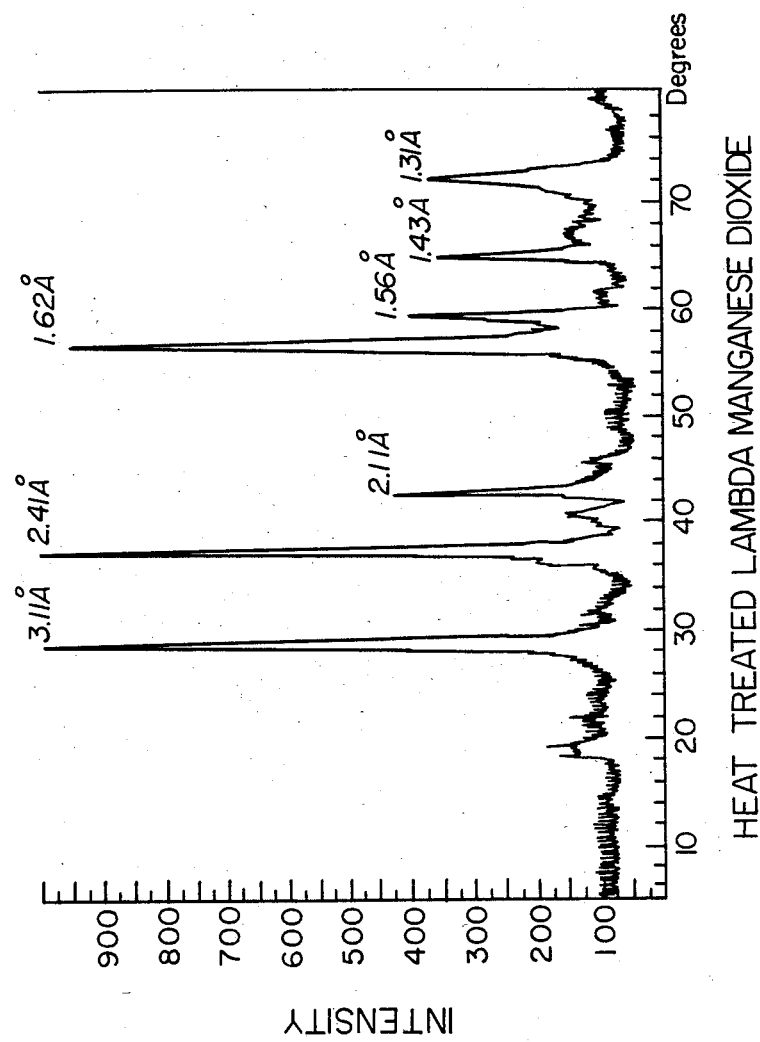
FIG. 1 shows the x-ray diffraction pattern of a typical sample of the manganese dioxide of this invention.
Figure 2:
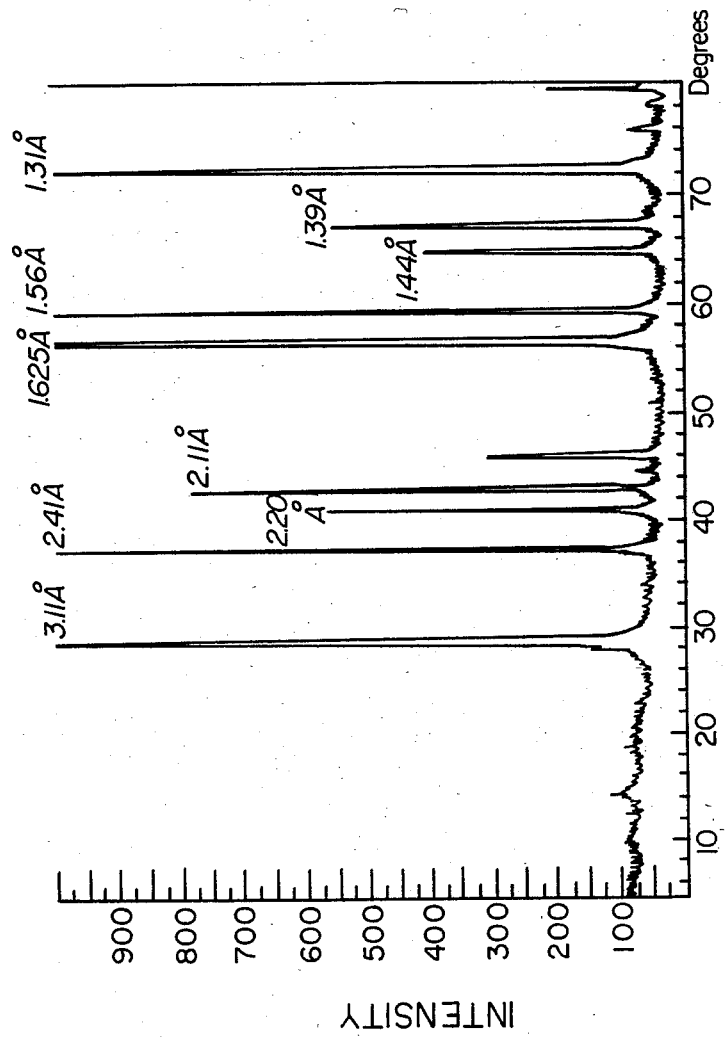
FIG. 2 shows the x-ray diffraction pattern of crystalline beta-manganese dioxide (I.C. Sample No. 6).

Ninety grams of lambda-manganese dioxide, produced in the manner described in Example II of U.S. Pat. No. 4,246,253, were heated in air at 350°–360° C. for seven hours. Elemental analysis of the product indicated that the product was manganese dioxide of the formula $MnO_{1.96}$. The surface area of this material was determined by conventional nitrogen gas absorption to be 5.15 m²/gram. The x-ray diffraction pattern of the manganese dioxide so produced was recorded employing a Philips Serial PRTE x-ray diffraction apparatus with automatic data gathering attachments. The x-ray pattern produced is shown in FIG. 1. For comparison purposes, the x-ray diffraction pattern of the lambda-manganese dioxide starting material was recorded on the same equipment, which x-ray pattern is reproduced in FIG. 3. Also for comparison purposes, the x-ray diffraction pattern of crystalline beta-manganese dioxide (I.C. Sample No. 6) was recorded, and is reproduced in FIG. 2. For comparison purposes these spectra are all recorded on the same scale of arbitrary units. The use of this particular scale requires that the tops of several peaks be omitted. However, for completeness the x-ray diffraction patterns of the three compounds are summarized in Table I.

TABLE I

X-Ray Diffraction Patterns of Manganese Dioxide

| Lambda-Manganese Dioxide | | Beta-Manganese Dioxide | | Heat-treated lambda-Manganese Dioxide | |
| --- | --- | --- | --- | --- | --- |
| Peak[1] | Relative Intensity[2] | Peak[1] | Relative Intensity[2] | Peak[1] | Relative Intensity[2] |
| 4.67 | 100 | 3.11 | 100 | 3.11 | 100 |
| 2.43 | 64.7 | 2.41 | 44.7 | 2.41 | 85.5 |
| 2.32 | 14.8 | 2.20 | 11.4 | 2.11 | 33.5 |
| 2.01 | 71.6 | 2.11 | 16.4 | 1.62 | 71.1 |
| 1.84 | 17.6 | 1.625 | 62.1 | 1.62 | 23.0 |
| 1.55 | 26.8 | 1.56 | 22.4 | 1.56 | 26.2 |
| 1.42 | 51.7 | 1.44[3] | 8.5 | 1.43 | 29.9 |
| 1.36 | 25.5 | 1.39 | 11.0 | 1.31 | |
| 1.21 | 11.4 | 1.31 | 30.7 | | |

[1]Plan spacing in angstroms, corresponding to peak Error range of ±0.02 angstroms.
[2]Intensity of peak at given spacing relative to highest peak in that spectrum multiplied by 100.
[3]Listed as "peak" although relative intensity is below 10 percent.

EXAMPLE 2

Several galvanic cells employing the novel manganese dioxide of this invention were each constructed as follows. Each cathode comprised 350 milligrams of the manganese dioxide produced in Example 1, which was mixed with 34.5 milligrams of graphite, 8.5 milligrams of acetylene black and 13 milligrams of polytetrafluoroethylene. This cathode mixture was molded into a pellet under a pressure of about 7250 kg/cm². The cathode pellets were then dried in air at 120° C. for 16 hours.

The molded cathodes were discharged against an anode comprised of 53.5 milligrams of lithium in a flooded electrolyte cell wherein the electrolyte comprised 1M $LiClO_4$ in 50:50 (volume percent) propylene carbonate:dimethoxyethane. The current drain was approximately 100 microamperes/cm² with superimposed intermittent pulse loads of 500 ohms for two seconds. For comparison, a similar sized sample of electrolytic manganese dioxide (a commercially useful manganese dioxide), "EMD", heat treated at 350°–360° C. for seven hours, was also discharged under the same conditions. The results of such testing are listed in Table II.

TABLE II

| | Heat Treated Lambda-Manganese Dioxide | | Heat Treated Electrolytic Manganese Dioxide | |
|---|---|---|---|---|
| Hours | Discharge | Pulsing | Discharge | Pulsing |
| 0 | 3.430[1] | 3.03 | 3.373[1] | 3.26 |
| .75 | 2.986 | 2.91 | 3.025 | 2.78 |
| 2 | 2.974 | 2.90 | 2.986 | 2.73 |
| 12 | ** | ** | ** | 2.61 |
| 19.25 | 2.954 | 2.83 | ** | ** |
| 23.5 | ** | 2.77 | ** | ** |
| 23.75 | ** | ** | 2.828 | 2.35 |
| 28 | ** | ** | ** | 2.10 |
| 29.25 | 2.842 | 2.58 | ** | ** |
| 32 | ** | ** | 2.593 | ** |
| 32.25 | 2.558 | ** | ** | ** |
| 33.5 | ** | ** | 2.462 | ** |

[1]Figures are open circuit voltages.
**Indicates not tested.

The above results indicate that the manganese dioxide of this invention performs comparably to commercially employed forms of manganese dioxide.

What is claimed is:

1. A galvanic cell comprising an anode, a cathode, and an electrolyte, at least a portion of said cathode comprising manganese dioxide having an X-ray diffraction pattern indicating peaks and relative intensities of peaks as follows:

| $d(\text{Å})$ | $I/I_O \times 100$ |
|---|---|
| 3.11 ± 0.02 | 100 |
| 2.41 ± 0.02 | 80–90 |
| 2.11 ± 0.02 | 28–38 |
| 1.62 ± 0.02 | 65–75 |
| 1.56 ± 0.02 | 18–28 |
| 1.43 ± 0.02 | 20–30 |
| 1.31 ± 0.02 | 25–35 | wherein d is the plane spacing corresponding to the particular peak, I is the peak height of the particular peak, and $I_O$ is the peak height of the highest peak.

2. The galvanic cell of claim 1 wherein said cathode further comprises a conductor and a binder.

3. The galvanic cell of claim 2 wherein said conductor is at least one member selected from the group consisting of graphite, carbon black, and metal powders.

4. The galvanic cell of claim 2 wherein said binder is at least one member selected from the group consisting of polytetrafluoroethylene and copolymers of ethylene and acrylic acid.

5. A galvanic cell comprising an anode, a cathode, and an electrolyte, at least a portion of said cathode comprising manganese dioxide having a surface area of less than about 15 m²/gram, and having an X-ray diffraction pattern indicating peaks and relative intensities of peaks as follows:

| $d(\text{Å})$ | $I/I_O \times 100$ |
|---|---|
| 3.11 ± 0.02 | 100 |
| 2.41 ± 0.02 | 80–90 |
| 2.11 ± 0.02 | 28–38 |
| 1.62 ± 0.02 | 65–75 |
| 1.56 ± 0.02 | 18–28 |
| 1.43 ± 0.02 | 20–30 |
| 1.31 ± 0.02 | 25–35 | wherein d is the plane spacing corresponding to the particular peak, I is the peak height of the particular peak, and $I_O$ is the peak height of the highest peak.

6. The galvanic cell of claim 5 wherein said cathode further comprises a conductor and a binder.

7. The galvanic cell of claim 6 wherein said conductor is at least one member selected from the group consisting of graphite, carbon black, and metal powders.

8. The galvanic cell of claim 6 wherein said binder is at least one member selected from the group consisting of polytetrafluoroethylene and copolymers of ethylene and acrylic acid.

9. A galvanic cell comprising an anode, a cathode, and an electrolyte, at least a portion of said cathode comprising manganese dioxide having a surface area of less than about 10 m²/gram and more than about 3 m²/gram, and having an X-ray diffraction pattern indicating peaks and relative intensities of peaks as follows:

| $d(\text{Å})$ | $I/I_O \times 100$ |
|---|---|
| 3.11 ± 0.02 | 100 |
| 2.41 ± 0.02 | 80–90 |
| 2.11 ± 0.02 | 28–38 |
| 1.62 ± 0.02 | 65–75 |
| 1.56 ± 0.02 | 18–28 |
| 1.43 ± 0.02 | 20–30 |
| 1.31 ± 0.02 | 25–35 | wherein d is the plane spacing corresponding to the particular peak, I is the peak height of the particular peak, and $I_O$ is the peak height of the highest peak.

10. The galvanic cell of claim 9 wherein said cathode further comprises a conductor and a binder.

11. The galvanic cell of claim 10 wherein said conductor is at least one member selected from the group consisting of graphite, carbon black, and metal powders.

12. The galvanic cell of claim 11 wherein said binder is at least one member selected from the group consisting of polytetrafluoroethylene and copolymers of ethylene and acrylic acid.

* * * * *